March 12, 1929.   C. G. HALL   1,705,112
WAITERLESS RESTAURANT
Filed Aug. 17, 1927   3 Sheets-Sheet 1
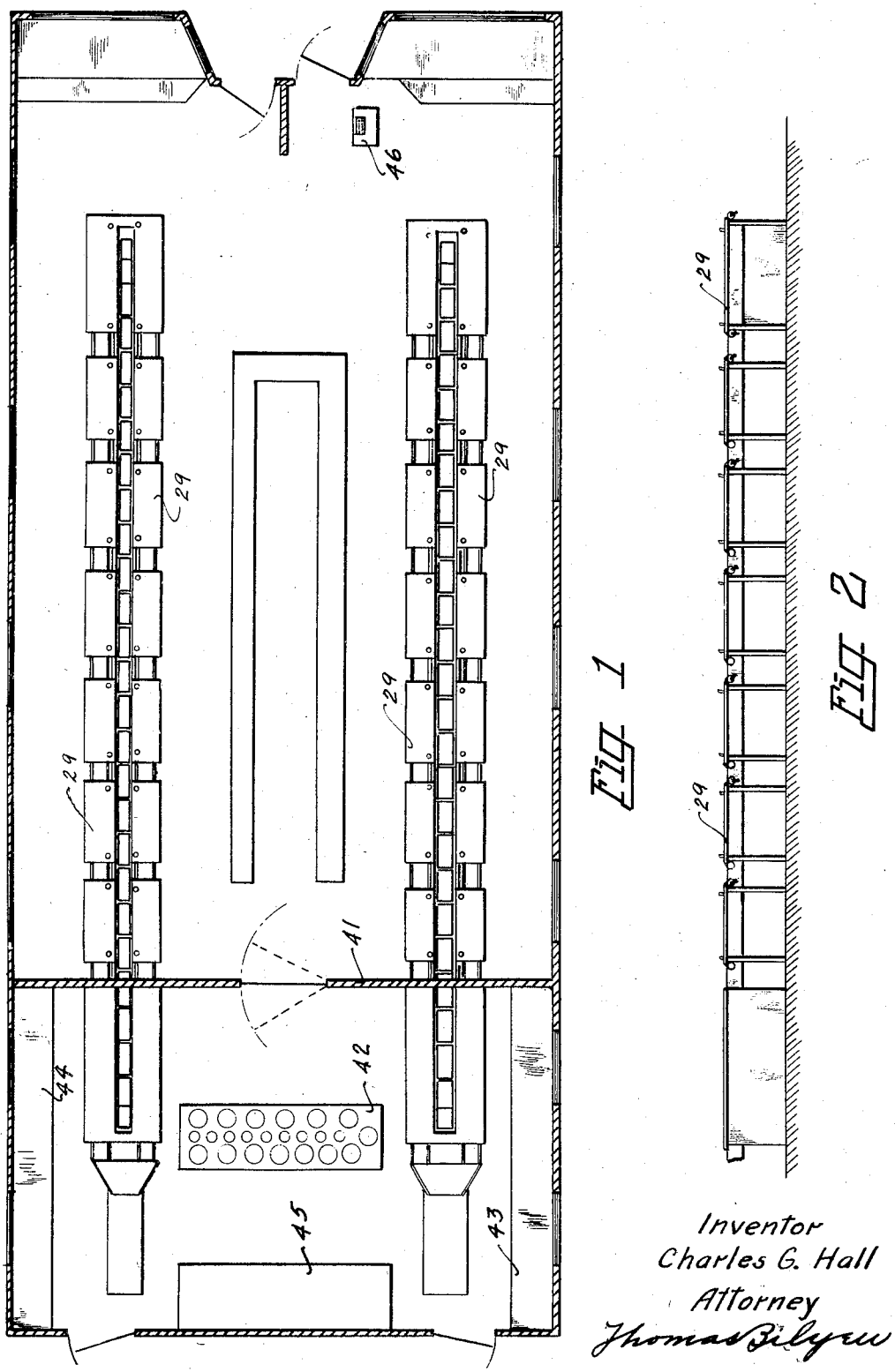
Inventor
Charles G. Hall
Attorney
Thomas Bilyeu

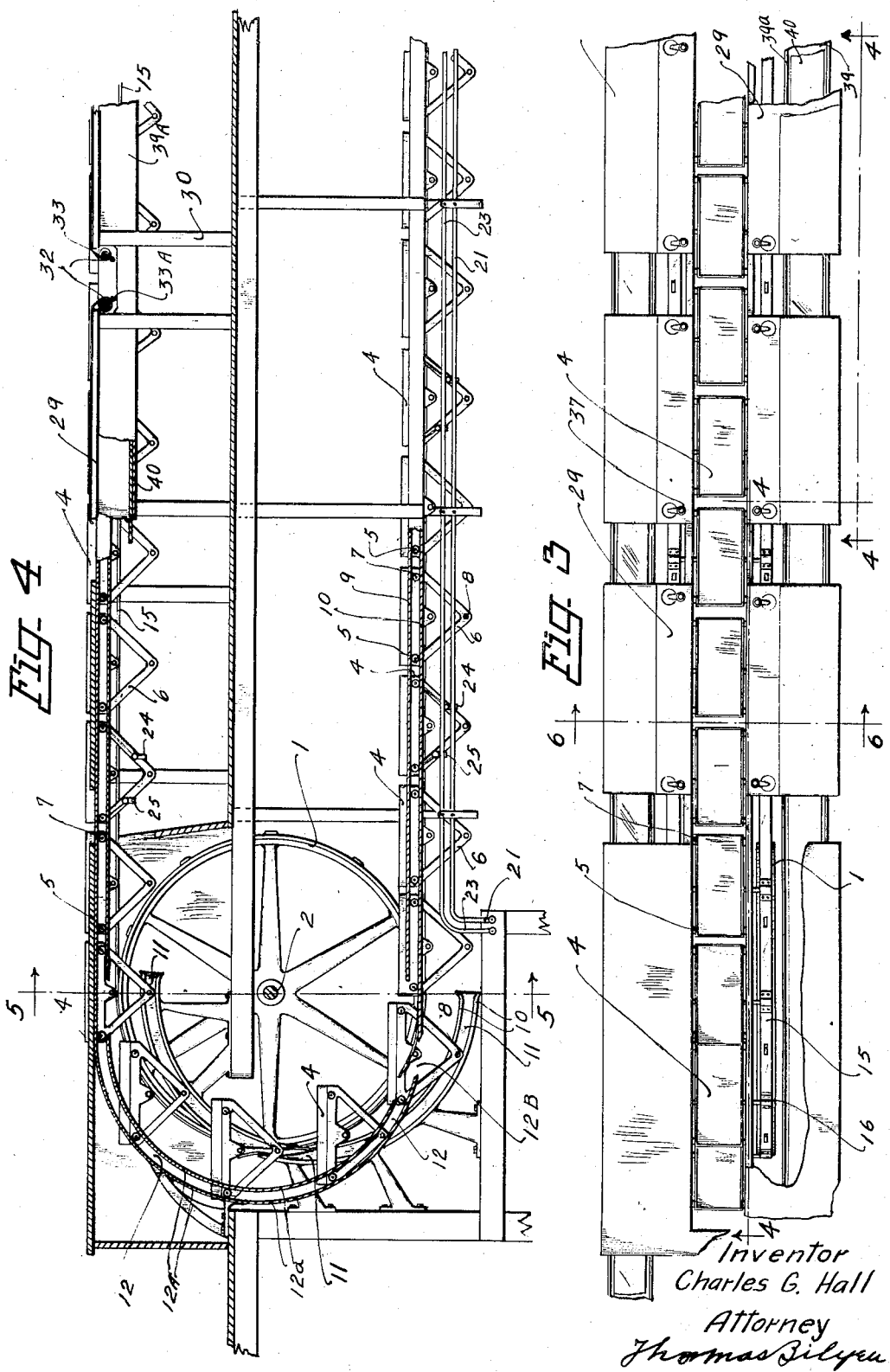

March 12, 1929.　　　C. G. HALL　　　1,705,112

WAITERLESS RESTAURANT

Filed Aug. 17, 1927　　　3 Sheets-Sheet 3

Inventor
Charles G. Hall

Attorney
Thomas Zilyeu

Patented Mar. 12, 1929.

1,705,112

UNITED STATES PATENT OFFICE.

CHARLES G. HALL, OF BOISE, IDAHO.

WAITERLESS RESTAURANT.

Application filed August 17, 1927. Serial No. 213,714.

My invention is intended for use in restaurants, boarding houses, hotels, and any and all places where articles of food and drink are to be served in quantities, and especially in those places where high rents are a factor in the food and drink prices and especially for use where a reduction in prices may be accomplished by the elimination of a substantial number of the employees. My invention comprises, primarily a series of platforms arranged in an endless series adapted to permit the same to carry articles of food and drink in display past a series of eating and drinking tables in such close proximity that the customers may be able to select such articles as they desire to purchase and personally remove the same and place the same upon the table, the table being so arranged that a fresh clean covering of strip material may be secured by the customer and when he has finished with the repast to deposit the soiled articles and the scrap materials upon an endless belt or conveyor and the same are thereupon transported to a central place where they may be removed and reconditioned. By the use of my invention it is not essential that the preparation of the articles of foods should be prepared upon the same floor in which they are to be consumed but they may be prepared upon a floor above or below the one in which the serving and sale are to be made. Further objects of my invention consist of an endless series of platforms that remain in an approximate plane of the sprocket wheels, one or more in number, at each end, lie horizontal and in fixed relation to the sprockets are guides, into which cross bars of the platforms pass. These guide races are so arranged, that the platforms are held approximately horizontal at all times.

Heating elements are disposed below all, or part, of the series of platforms and heat the platforms by passing the electric current through the heating elements by the current picked up from electric conductors running along the line of travel of the endless disposed traveling platforms. Water may be taken from faucets connected to water lines adapted to being operated from the eating tables, the same being arranged to permit the surplus water drawn to drain into drain pipes from a depression disposed below each of the faucets.

For a more complete description of my invention reference is had to the accompanying drawings, in which:—

Figure 5:
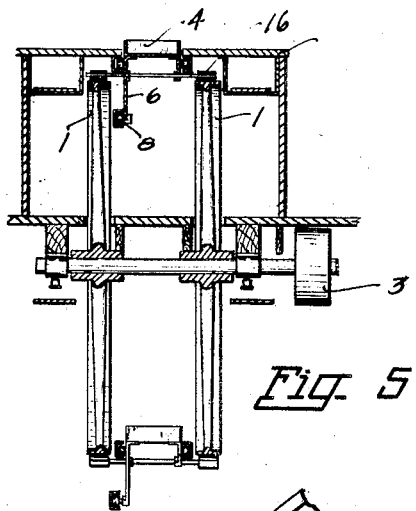
Figure 6:
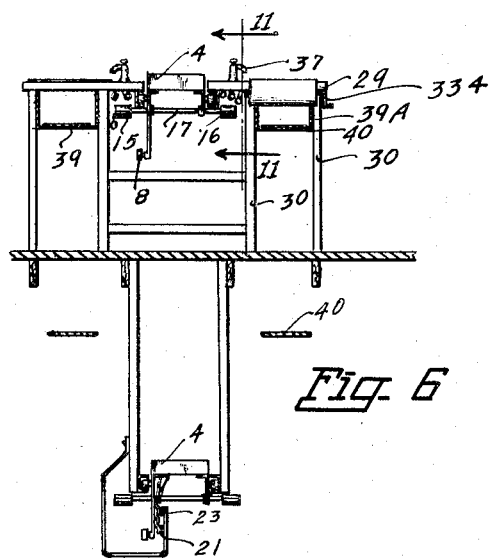
Figure 7:
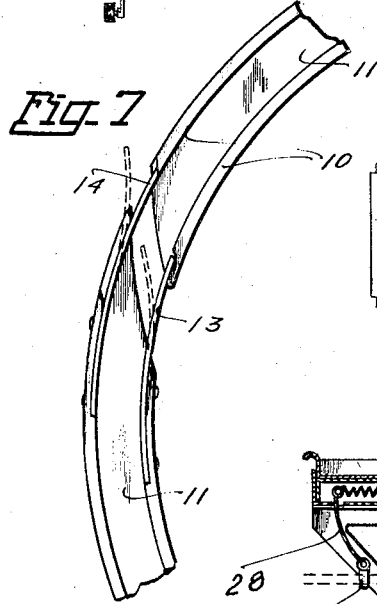
Figure 8:
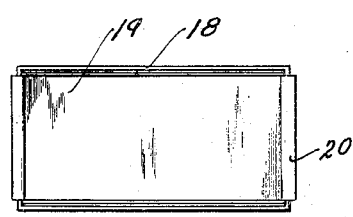
Figure 10:
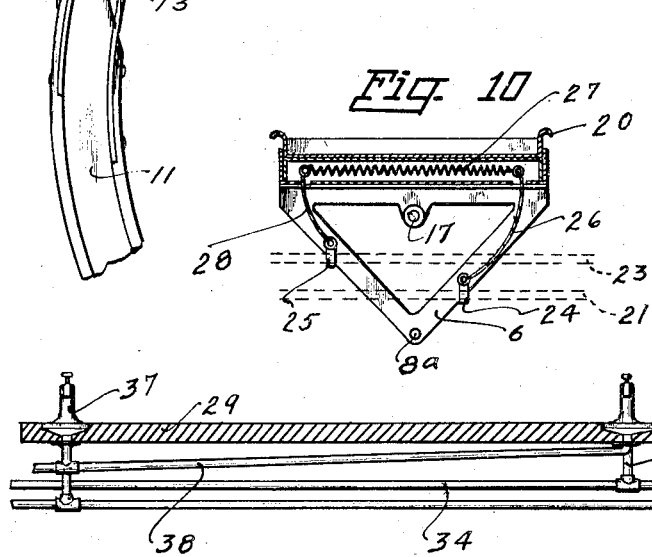
Figure 9:
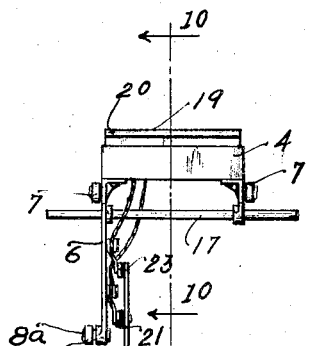

Fig. 1 is a typical plan of arrangement of an eating and drinking establishment wherein my invention has been installed and wherein the preparation of the food materials are shown to be on the same floor, and Fig. 2 is a side elevation of the same. Fig. 3 is an enlarged partial plan view illustrating the construction of the mechanism comprising the primary part of my invention showing the parts in relation to each other and the construction of the same. Fig. 4 is a partial side elevation, partial section view of the same mechanism. Fig. 5 is a partial section, partial end view of the same taken on line 5—5 of Fig. 4 looking in the direction indicated by the arrows. Fig. 6 is a partial section view taken along line 6—6 of Fig. 3 looking in the direction indicated by the arrows. Fig. 7 is a partial side elevation of the race, or guide, for the passage of the cross bars that maintain the series of platforms in an approximate horizontal position as the same pass around the sprocket like wheels. Fig. 8 is a plan view of one of the moving platforms here shown detached from the belt arrangement, in this view is shown the tray like form of the same and which forms a panel depression into which may be placed the articles of food and drink to be displayed. Fig. 9 is an end view, showing in detail, the construction of one of the display platforms and Fig. 10 is a section taken on line 10—10 of the parts shown in Fig. 9, in the Figures 9 and 10 the electric heating element and the electric circuits, also, are shown and the contacts for conducting the electric current from the conductors through the heating element. While I have here shown the heating element and disclosed a means for supplying electric current in certain of the moving display platforms, yet it may not be necessary to supply these heating elements to but a small number of them because certain of the foods require heat and others do not. This is because the food is supplied for but a short time only, sufficient for the endless procession of platforms to complete one cycle of operation, when the same may be removed and again placed in the cooker or warmer.

Figure 11:
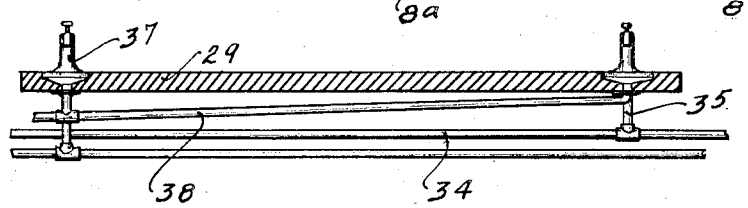

Fig. 11 shows the method of supplying running water to each of the tables and also the method of disposing of the overplus that may occur or the drippings that follow the drawing of water from a faucet.

Like reference characters refer to like parts throughout the several views:—

1 are sprocket-like wheels, here shown as two in number, one each at each pivotal center, which are secured to shafts 2 and which are caused to rotate when power is applied to driving pulley 3 by means of a belt or other driving means. This affords a rotation to the sprockets and at the same time drives the belts to which an endless series of platforms 4 are attached. These platforms are used for the display of articles of food and drink to be offered for sale. These platforms while operated in endless procession are secured, in pivotal manner, to endless belts and are made to remain in an approximate horizontal position. In doing so articles of food and drink placed thereupon may be removed therefrom, at any point in their line of travel. These platforms are not attached to each other except by the endless belts heretofore mentioned. 6 is a depending link-like arrangement having bars 5 and 7 attached thereto. These rollers engage a track or bed, and one being in advance of the other, and on either side of the platforms hold the platforms in a horizontal plane during the travel of the platforms between the vertical center line passing through the sprockets, but as soon as the same turn past the vertical center line they must be held in a horizontal position by other means. To accomplish this result I have shown somewhat in detail the construction of my invention that accomplishes this result in section in Fig. 4. Two race-like guides are formed, semicircular in form, and through which the rollers supported upon stub spindles enter the race and remain in position until the half circumference of the sprocket like drive wheels are traversed, at which they again travel along a horizontal track until the vertical center line of the sprockets on the opposite end are reached at which point the operation is again repeated and the moving platforms are again held in horizontal position until the same are passed around a half circumference as the platforms move along the rollers 8 mounting the spindle 8$^a$ enters the raceway 11 and is held in locked position in its travel by the guide plates 10. As the platforms progress the forward one of the rollers 7 enters the guide race 12 and it is held in position by the guide plates 12$^a$. Each of these lines cross the guide races and in order that no interference may occur a break or gap is provided as is shown by springs 13 and 14 in Fig. 7. By providing these gaps with spring closures as shown, the path of travel of the guide bearing rollers is interrupted and the platforms pass on around the sprockets held in a horizontal position while doing so. This gap in the race way 12 occurs as shown in Fig. 4 at 12$^b$ and it is only necessary on the outer guide plate to have a spring at the crossing point of the roller to the guide race. To afford mobility to the display mechanism the same is journaled in bearings 16 that are secured to the belt 15 and are held together by the cross rod 17. These belts are endless and pass around the sprockets at either end of the machine. The platforms that are to be used for holding the display trays are shown at 18 and have removable trays placed therein as shown at 9. These trays have curled edges as shown at 20 that serve as handle means to afford easy handling of the trays. To carry electric current along the line of travel of the platforms I have provided electric cables 21 and 23 which carry electric current from an outside source, not here shown, to the point of use. 24 and 25 are electric contact shoes or brushes that pick up the electric current and the same passes through the conductor 26 to the heating elements 27 thence through the conductor 28 back to the cable 23. These heating elements are placed under one or more of the moving platforms and are used to maintain the same in a warm condition during the period of display that occurs during the passage of the platforms past the eating table.

A series of eating tables are provided as shown at 29 these tables are parallel to, and in close proximity to the line of travel of the series of display platforms. These eating tables are supported by supporting legs 30. In order to provide a clean strip of material to serve as a table cloth I have provided two spools or drums from one of which the strip material is unwound and onto the other the material is wound after use, these spools or drums are shown at 32 and 33 and the winding drum has a crank 33$^a$ for turning the same. When the strip material is completely used up a new one may be put on to replace the old one at which time the soiled one may be reconditioned, or thrown away. To make possible a complete service without waiters, I have provided a means for the customer having fresh water service at the table by piping the water to each table and the further provision of a faucet at which the customer may draw his personal requirements. The water service pipe is shown at 34 and a riser is provided at each table as shown at 35 the faucet as shown at 37, these drip basins are connected to a waste pipe 38 that runs to a source of deposit where the same may be wasted. The disposition of the soiled dishes and refuse is accomplished by the placing of the same upon an endless carrier belt in constant motion. This belt is shown at 40 and to prevent the articles placed thereupon from falling off the conveyor belt runs in a trough like channel 39 having side members 39ª. I have shown an arrangement or work layout in the drawings wherein the same is all on one floor with a partition 41 across the room and through which the endless series of platforms and the conveyor belts pass. 42 are the steam cookers and 43, 44 and 45 are the work tables. In this layout the work of the preparation of the food is all done in close proximity to the display platforms and the endless conveyor belts return the soiled articles and the scrap material into the workroom also, where the same may be reconditioned and the waste material be disposed of without the aid of waiters in the main dining room. The cashier desk is shown at 46.

Having thus described my invention in such detail that any one skilled in the art could construct and operate the same, I wish to make the following claims therefor:—

1. A waiterless restaurant comprising a series of display platforms adapted to being maintained in horizontal position and journalled in bearings attached to endless belts adapted to being driven by sprockets around which they pass, removable trays adapted to being held in place within the display platforms, means for maintaining heat beneath one or all of the display platforms, a line of eating tables parallel to the line of travel of the display platforms, a water service at each of the eating tables and means for supplying a clean strip of material transversely the eating tables, and a conveyor belt adapted to the removal of materials from the eating tables.

2. A waiterless restaurant comprising a series of display platforms adapted to maintaining removable trays and being held in horizontal position as carried in endless procession past a series of adjacent eating tables, a conveyor belt operated in a trough like channel adapted to having deposited thereupon articles to be carried from the eating tables and deposit same at the change of direction of travel of the conveyor belt, strip material mounted upon spool like drums and passing transversely the tables and means for pulling the strip material across the table and unwinding from one drum onto the other, a water service at each table and piped means for carrying surplus water from the water service.

3. A waiterless restaurant comprising sprockets adapted to being driven and being mounted upon horizontal axles and mounting endless belts having journalled thereto a series of display platforms adapted to carrying articles of food and drink in display past a series eating tables across which may be drawn strip material from one spool like drum upon another, water service at each eating table, a conveyor belt service at each eating table, and means along the line of travel of the display platforms to maintain the same in horizontal position.

4. A waiterless restaurant comprising a series of endless belts driven by two or more series of sprocket wheels and adapted to being driven in endless procession, a series of display platforms journaled within bearings secured to the endless belts and adapted to being held in horizontal position in relation to the belts as driven, means for maintaining heat elements beneath one or more of the display platforms, eating tables along the line of travel of the display platform, work tables and a steam table adjacent one end of the line of travel of the display platforms, and a conveyor belt adjacent the eating tables driven in a trough like channel to maintain articles placed thereupon.

5. A waiterless restaurant, comprising a series of display platforms adapted to being maintained in horizontal position and journaled in bearings attached to endless belts adapted to being driven by sprockets around which they pass, raceways adapted to maintain the platform in a horizontal position when their direction of travel is changed, removable trays adapted to being held in place within the display platforms, means for maintaining heat beneath one or all of the display platforms, and a line of eating tables parallel to the line of travel of the display platforms.

6. A waiterless restaurant, comprising a series of display platforms adapted to being maintained in horizontal position and journaled in bearings attached to endless belts adapted to being driven by sprockets around which they pass, raceways adapted to maintain the platforms in a horizontal position when their direction of travel is changed, removable trays adapted to being held in place within the display platforms, means for maintaining a heat element beneath one or all of the display platforms, a line of eating tables parallel to the line of travel of the display platforms, a water service at each of the eating tables, and a conveyor belt adapted to the removal of materials from the eating tables.

7. A waiterless restaurant, comprising a series of display platforms adapted to maintaining removable trays and being held in horizontal position, as carried in endless procession past a series of adjacent eating tables, electric heating elements maintained in one or more of the display platforms, and a means to supply electric current to said heating elements.

8. A waiterless restaurant, comprising a series of display platforms adapted to maintaining removable trays and being held in horizontal position as carried in endless procession past a series of adjacent eating tables, electric heating elements maintained in a plurality of said display platforms, a means to supply electric current to said heating elements, a conveyor belt operated in a trough like channel adapted to having deposited thereupon articles to be carried from the eating tables and deposit the same at the change of direction of travel of the conveyor belt, a water service at each table, and piped means for carrying surplus water from the water service.

9. A waiterless restaurant comprising a series of display platforms adapted to maintaining removable trays and being held in horizontal position as carried in endless procession past a series of adjacent eating tables, electric heating elements maintained in one or more of said display platforms, a means to supply electric current to said heating elements, a conveyor belt operated in a trough like channel adapted to have deposited thereupon articles to be carried from the eating tables and deposit the same at the change of direction of travel of the conveyor belt, strip material mounted upon spool like drums and passing transversely the tables and means for pulling the strip material across the table and unwinding from one drum on to the other, a water service at each table, and piped means for carrying surplus water from the water service.

CHARLES G. HALL.